June 11, 1963 M. KARNAUGH 3,093,815

PULSE REPEATING SYSTEM

Filed May 31, 1960 3 Sheets-Sheet 1

INVENTOR
M. KARNAUGH
BY R. O. Nimz
ATTORNEY

June 11, 1963 M. KARNAUGH 3,093,815

PULSE REPEATING SYSTEM

Filed May 31, 1960 3 Sheets-Sheet 2

INVENTOR
M. KARNAUGH

BY R. O. Nimtz

ATTORNEY

June 11, 1963 M. KARNAUGH 3,093,815

PULSE REPEATING SYSTEM

Filed May 31, 1960 3 Sheets-Sheet 3

INVENTOR
M. KARNAUGH
BY R. O. Nimtz
ATTORNEY

United States Patent Office 3,093,815
Patented June 11, 1963

3,093,815

PULSE REPEATING SYSTEM

Maurice Karnaugh, Warren Township, Somerset County, N.J., assignor to Bell Telephone Laboratories, Incorporated, New York, N.Y., a corporation of New York Filed May 31, 1960, Ser. No. 32,793
10 Claims. (Cl. 340—173)

This invention relates to repeaters for pulse transmission systems and, more particularly, to the retiming of pulse trains subjected to phase distortions by transmission through imperfect transmission media.

It has heretofore been proposed to derive the basic timing information necessary to retime a pulse train from the pulse train itself. This has been accomplished by controlling the frequency of a local oscillator by the phase difference between the incoming pulse train and the local oscillator output. Phase distortions or phase "jitters" are reduced by allowing the local oscillator to smooth out discrepancies in the phase of the incoming pulse train. In long transmission systems, however, where phase discrepancies may equal or exceed a full pulse period of the incoming pulse train, the above-described scheme can compensate only for discrepancies of a fraction of a pulse period and must "track" larger order phase discrepancies in order to remain in synchronization.

It is an object of the present invention to improve the operation of retiming pulse repeaters utilized in transmission systems producing substantial phase distortions.

It is a further object of the invention to increase the range of phase discrepancies which can be compensated by the retiming circuits of a pulse repeater.

In accordance with the present invention, coarse retiming information is derived from an incoming pulse train in much the same manner as described with respect to the hitherto proposed schemes described above. This coarse timing information is utilized to write the successive elements of a pulse code each into one of a number of buffer storage elements in a fixed cyclic order. At some later time, for example, half of the period of a storage cycle, this information is read from the buffer storage elements under the control of a highly stabilized local clock. The clock frequency, and hence the readout rate, is controlled by a signal representing the average amount of information stored in the buffer storage elements at any particular instant.

It can be seen from the above description that the coarse timing information is utilized only to write the pulse data into the buffer storage elements. The coarse time recovery circuits are adjusted to closely track the incoming pulse train and thus remove only a very small portion of the phase jitter present in the input. Once the pulse information is stored in the buffer storage elements, however, it is possible to utilize a very highly stabilized local clock to read out this information at an essentially constant rate. The local clock rate is made responsive to the average amount of data in the buffer storage elements to prevent undue accumulations in or depletions from the buffer store.

A major advantage of the present invention resides in its ability to correct phase jitter equalling or exceeding a full pulse period, and up to several pulse positions, as well as phase discrepancies of a fractional part of a pulse period. Since a buffer store of any arbitrary capacity may be provided, any phase discrepancies which might be encountered can be compensated for. As has been pointed out, previous systems were required to follow phase discrepancies exceeding a fraction of the pulse period, rather than correct them, in order to remain in synchronism.

All of the above advantages flow from the combination of a coarse timing function, a buffer store and a fine timing function under the control of the buffer store. The coarse timing information is used only to make entries in the storage elements while the fine timing information is utilized to control the actual repeater output.

These and other objects and features, the nature of the present invention and its various advantages, will be more fully understood upon consideration of the attached drawings and of the following detailed description of the drawings.

Figure 1:
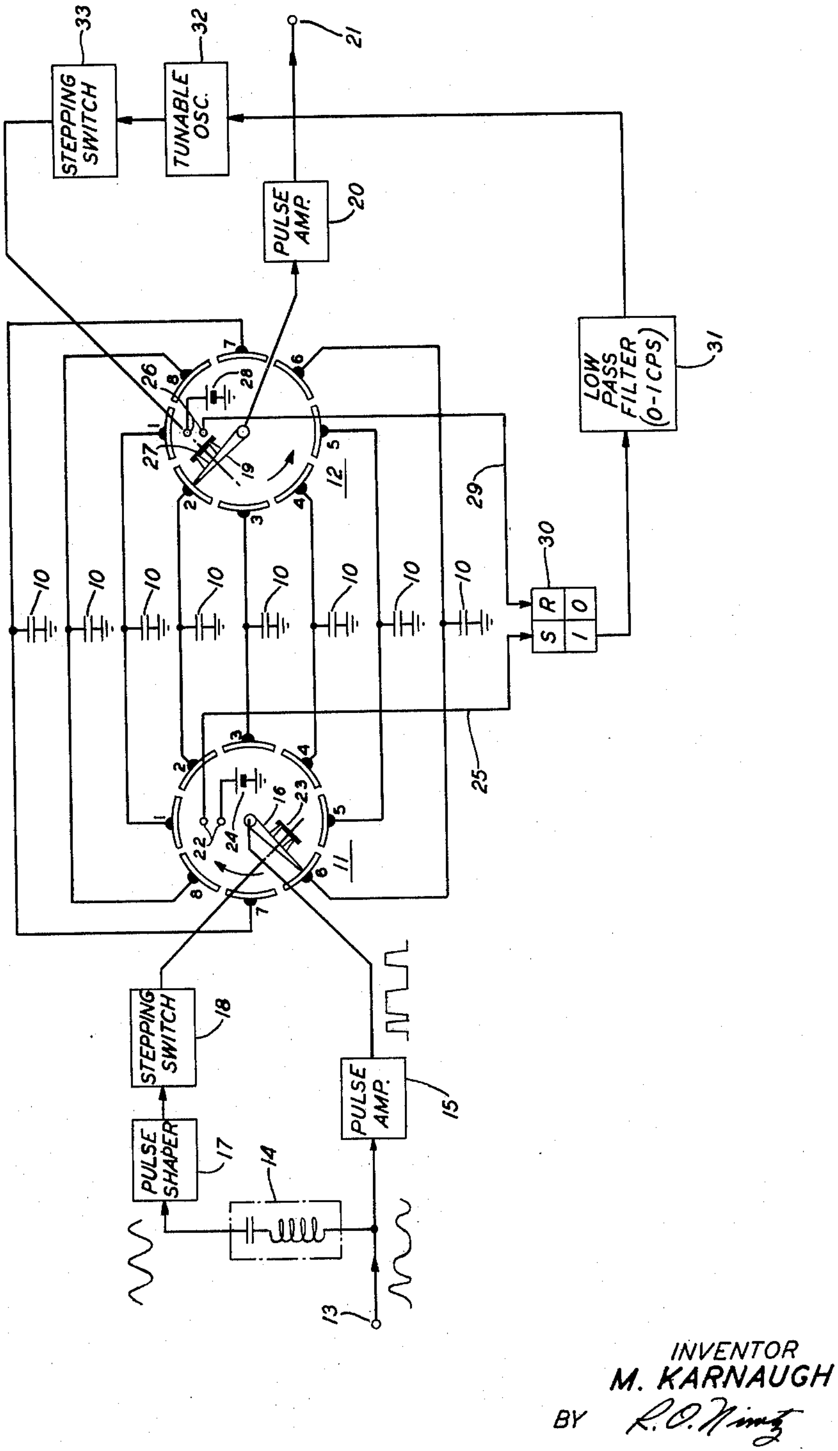
FIG. 1 is a schematic block diagram of a retiming pulse repeater in accordance with the present invention including a cyclical time comparator for clock control.

Referring more particularly to FIG. 1, there is shown a pulse repeater in accordance with the present invention comprising a plurality of pulse storage elements 10 and an input distributor 11 for writing pulse information into the various storage elements 10. Also included is an output collector commutator 12 for reading out the information stored in elements 10. For purposes of convenience, the storage elements 10 have been illustrated in FIG. 1 as simple capacitors and the commutators 11 and 12 as mechanical commutators. It is to be understood, however, that the storage elements 10 may comprise any known pulse storage means such as binary cells for binary pulses, closed delay loops and so forth. Similarly, commutators 11 and 12, in most practical embodiments, would comprise electronic commutators such as ring counters or conventional binary counters operating electronic gates.

An input information pulse train which has been subjected to various forms of distortion by transmission through an imperfect transmission medium is applied to terminal 13. This input pulse train is simultaneously applied to a flywheel time recovery circuit 14 and a pulse amplifier 15. For convenience, flywheel circuit 14 is illustrated as a simple series LC filter which is tuned to the nominal repetition rate of the inpute pulse train. It is to be understood, however, that a parallel LC section, or some more complex form of narrow band-pass filter would be equally suitable. Flywheel circuit 14 is tuned sufficiently broadly to allow the oscillations therein to follow the actual phase variations of the input pulse train and yet is tuned sharply enough to provide a flywheel effect, that is, to supply oscillatory peaks at those times in which no pulse appears in the input pulse train.

Pulse amplifier 15 may be a broad-band linear amplifier or, in binary systems, a simple threshold device which produces a fixed amplitude pulse during intervals in which the input signal exceeds the preselected threshold. The output of pulse amplifier 15 is applied directly to brush 16 of input commutator 11. The output of flywheel circuit 14 is applied to a pulse shaping circuit 17 in which the sinusoidal oscillations of the flywheel circuit are transformed into short high-amplitude pulses. These pulses are, in turn, applied to a stepping switch 18 which serves to drive the brush 16 of commutator 11 in a clockwise direction. That is, each time a pulse triggers stepping switch 18, brush 16 advances one commutator segment in a clockwise direction on commutator 11. Since these triggering pulses follow the frequency and phase variations of the input pulse train, this arrangement serves to deliver the information in succeeding pulse positions of the input pulse train to successive ones of the segments of commutator 11.

A pulse storage element 10 is connected to each of the segments of commutator 11. The code element delivered by way of brush 16 in any one of the commutator segments is stored in the connected one of the pulse storage elements 10. These storage elements are depicted as capacitors, for convenience, it being understood that any other form of pulse storage element would be equally suitable.

Commutator 12 has the same number of segments as commutator 11 and, indeed, has each segment connected directly to one of storage elements 10 and the corresponding segment of commutator 11. A brush 19 on commutator 12 is caused to rotate in a counterclockwise direction to successively contact the various segments of commutator 12. A second pulse amplifier 20 is connected to brush 19 and is utilized to further amplify the pulses delivered to brush 19 and deliver them to an output terminal 21.

Included on commutator 11 are a pair of contacts 22 and a contact bar 23 arranged so that bar 23 closes a circuit between contacts 22 once for each full revolution of brush 16. A battery 24 delivers a pulse to control lead 25 each time bar 23 shorts out contacts 22.

Similarly, a pair of contacts 26 and a contact bar 27 on commutator 12 are arranged so that bar 27 connects contacts 26 once for each full revolution of commutator 12. A battery 28 delivers a pulse to control lead 29 each time this contact is made.

Pulses on control lead 25 serve to set bistable device 30 in one of its two stable states. Pulses on control lead 29, on the other hand, serve to reset bistable device 30 to the other of its stable states. Bistable device 30 may comprise any conventional bistable multivibrator circuit which produces two distinguishable outputs, at least one of which is a steady state current or voltage. This output is applied to a low-pass filter circuit 31 having an extremely low cut-off frequency, for example, on the order of one cycle per second. The output of filter 31 is applied to an oscillator circuit 32 to change the tuning on oscillator 32 by an amount approximately linearly related to the amplitude of the output of filter 31. The output of oscillator 32 is applied to a stepping switch 33 similar to stepping switch 18 which serves to step brush 19 across the successive segments of commutator 12.

From the above description it can be seen that flywheel circuit 14 derives coarse timing information from the input pulse train and utilizes this coarse timing information to successively advance brush 16 across the segments of commutator 11. Simultaneously, after being amplified in amplifier 15, the input pulse train is applied directly to brush 16. This arrangement serves to write the successive elements of the input pulse train on successive ones of capacitors 10. The oscillator 32 and stepping switch 33 similarly serve to step brush 19 across the segments of commutator 12, thus to read the code elements stored on capacitors 10 into pulse amplifier 20 and thence to a utilization circuit connected to terminal 21.

Brush 19 is arranged to be 180 degrees out of phase with brush 16. That is, if these brushes are stepping at exactly the same rate, brush 16 will be writing a code element by way of commutator segment 1 while brush 19 is reading a code element from commutator segment 5. Brush 16 has therefore been illustrated as contacting segment 6 and brush 19 as contacting segment 2. As long as the repetition rate of the input pulse train applied to terminal 13 and the frequency of oscillator 32 are exactly equal, this 180 degree phase lag will be maintained.

The pulses delivered by way of contacts 22 and control lead 25 have a repetition rate equal to the average stepping rate of commutator 11 over one complete cycle. Similarly, the pulses delivered by way of contacts 26 and control lead 29 have a repetition rate equal to the average stepping rate of commutator 12 over one complete cycle. Since these commutators are normally operated at the same frequency and their respective brushes are normally 180 degrees out of phase, bistable device 30 is in the set condition for one half the period of these commutators and reset for the other half period. The output applied to low-pass filter 31 therefore comprises a symmetrical square wave having a repetition rate equal to the rate of revolution of brushes 16 and 19. Low-pass filter 31 smooths this square wave and removes its basic repetition rate as well as all higher harmonics thereof. When commutators 11 and 12 are operated at the same frequency, the output of filter 31 comprises a constant voltage which is used to adjust the frequency of oscillator 32 to the nominal repetition rate of the input pulse train.

If phase distortions in the transmitting medium create phase discrepancies or phase jitter between successive pulses of the input pulse train, the frequency of commutator 11 will no longer match that of commutator 12. If the phase of successive pulses has been advanced, brush 16 will be advanced across its associated commutator segments at a faster rate than brush 19. Under this condition, bistable device 30 is set at an earlier time than it would normally be set, and the output wave from device 30 is no longer a symmetrical wave but includes a proportionately longer "on time." This is reflected at the output of filter 31 as an increase in the average voltage of the output wave. This increase can be used to tune oscillator 32 to a somewhat higher frequency, causing commutator 12 also to increase its speed.

On the other hand, when commutator 11 slows down, due to a phase retardation of the input pulses, the pulses appearing on control lead 25 are later than normal and the "on time" of device 30 is less than normal. This results in a decrease in the output level of filter 31 which causes oscillator 32 to reduce its frequency and thus tends to bring commutator 12 into synchronism with commutator 11.

It will be noted that since brush 16 writes pulse coded data into storage elements 10 and brush 19 reads this data out of elements 10, the "on time" of bistable device 30 is a measure of the amount of data stored in storage elements 10 during each particular cycle. This information concerning the contents of the storage elements is utilized by way of filter 31 to tune oscillator 32.

It can therefore be seen that the essential components of the pulse repeater of FIG. 1 are a coarse timing function to write information into storage elements and a fine timing function to read this information out of the elements. Oscillator 32 is designed to have very stable frequency characteristics and therefore may include a crystal frequency control element. Since the tuning control signal is derived from a low-pass filter 31 having an extremely low cut-off frequency, oscillator 32 will respond only to the long term phase discrepancies in the input pulse train and will not be affected by transitory phase discrepancies. The output at terminal 21 will therefore have an essentially constant repetition rate which will vary only if there are significantly large and prolonged discrepancies in the phase of the input pulse train, such as might be caused by changes in rate at which the input pulse train is generated.

Commutators 11 and 12 have been illustrated with eight segments each, and a corresponding eight pulse storage elements 10 have likewise been illustrated. It is to be understood, however, that this number is entirely arbitrary and may be chosen so as to best serve the requirements of the particular system in which the invention is to be used. Since brushes 16 and 19 can vary in their relative phase by as much as 180 degrees before an ambiguity occurs, the storage elements 10 in FIG. 1 can store up to four separate code elements to compensate for phase discrepancies in the input pulse train. That is, a phase discrepancy of up to four full pulse periods can be completely compensated for by the arrangement of FIG. 1. By the simple expedient of increasing the number of storage elements 10 and the corresponding number of segments on commutators 11 and 12, an arbitrarily large phase discrepancy can be compensated for in a similar manner.

If brushes 16 and 19 rotate at a sufficiently low rate, because, for example, of the large number of storage elements 10 of the low input pulse rate, the square wave output of bistable device 30 may have frequency components approaching the cut-off frequency of filter 31. These components will introduce spurious variations in the control signal applied to oscillator 32 and therefore undesired jitter into the output pulse train. In order to increase the discrimination against such spurious components of the control signal, FIG. 2 discloses a modification of the pulse repeater of FIG. 1 in which the spurious frequency components of the phase comparator are further removed from the pass-band of the control signal filter.

Figure 2:
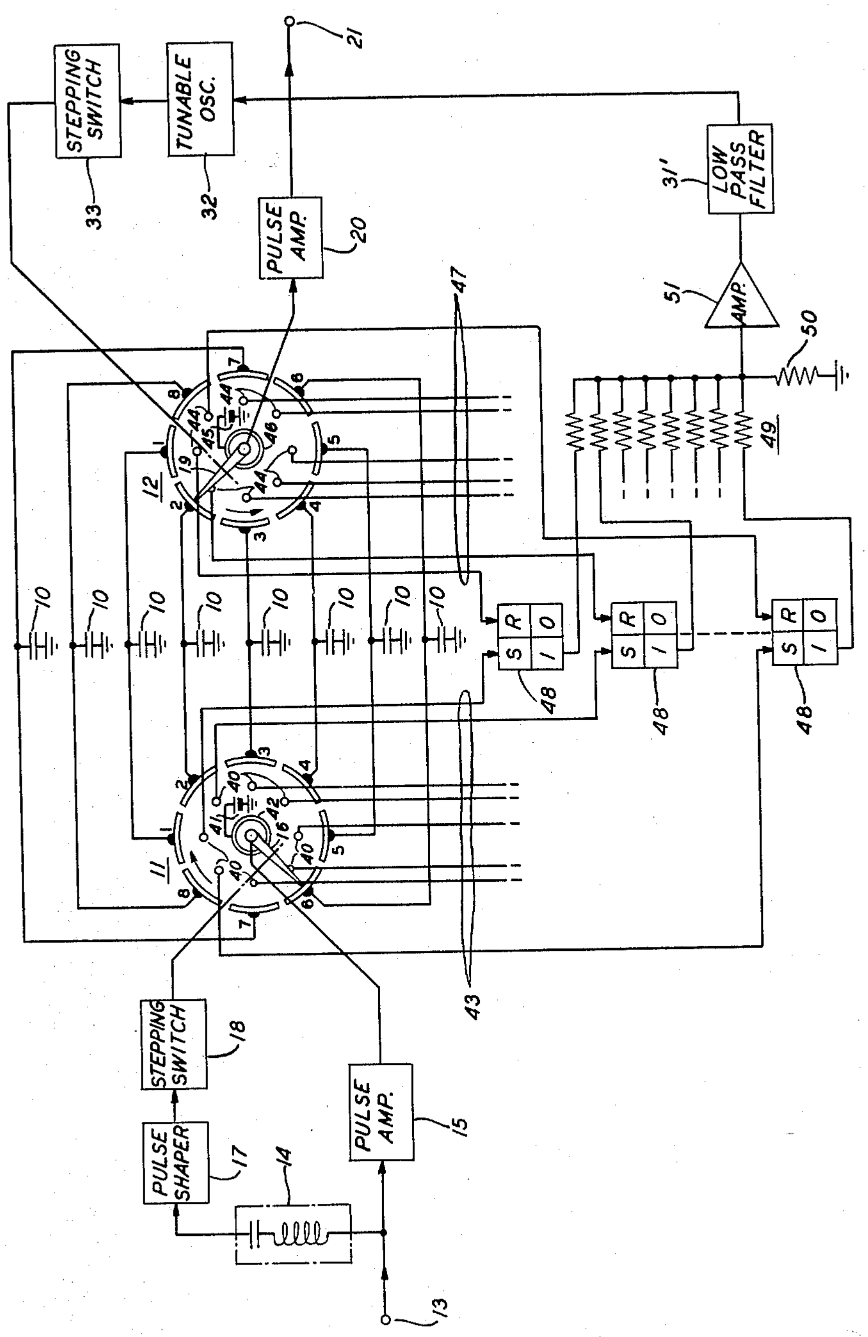
FIG. 2 is a schematic block diagram of the repeater circuit of FIG. 1 modified to improve the clock control.

In FIG. 2 there is a modified version of the repeater circuit of FIG. 1 which secures these additional advantages. In FIG. 2 identical reference numerals have been used to identify similar components. Thus, an input pulse train applied to terminal 13 is simultaneously applied to a flywheel circuit 14 and a pulse amplifier 15. The output of flywheel circuit 14 is applied to pulse shaper 17 and then to a stepping switch 18 which is used to step the brush 16 of commutator 11 in a clockwise direction. The output of pulse amplifier 15 is applied to brush 16 which successively connects the pulse code elements appearing at the output of amplifier 15 to the various segments of commutator 11.

Similarly, a tunable oscillator 32 is used to drive a stepping switch 33 which advances the brush 19 of commutator 12 in a counterclockwise direction. Brush 19 picks up pulse code elements from the various segments of a commutator 12 and delivers them to a pulse amplifier 20 which amplifies the pulses and applies them to an output terminal 21.

Included in commutator 11 are a plurality of contacts 40, one for each of the eight segments of commutator 11. A battery 41 applies voltage to ring 42. In advancing around commutator 11 brush 16 is arranged to successively make contact between ring 42 and the different ones of contacts 40 to successively deliver pulses to the eight control leads 43.

Commutator 12 is similarly constructed to include a plurality of contacts 44 equal in number and corresponding to the segments of commutator 12. A battery 45 applies a voltage to ring 46. In stepping around commutator 12, brush 19 successively connects ring 46 to the various contacts 44 and delivers pulses to the control leads 47.

Each of the control leads 43 is connected to the set input of one of a bank of bistable devices 48, corresponding in number to the number of storage elements 10 and the number of segments on commutators 11 and 12. Similarly, each of control leads 47 is connected to the reset input of a corresponding one of the bistable devices 48. The outputs of bistable devices 48 are applied to a summing network 49 which serves to provide a voltage across resistor 50 proportional to the combined outputs of those of bistable devices 48 which are in the "On" state at any particular instant. This voltage is amplified in amplifier 51 and applied to a low-pass filter 31′ which derives a control voltage therefrom to tune oscillator 32.

As has been seen from the above description, pulses are produced on control leads 43 and 47 each time brushes 16 and 19 are advanced to a new segment on their respective commutators. Each of bistable devices 48 is therefore turned On when a code element is written into a corresponding one of storage elements 10 and is turned Off when this same code element is read out of this storage element. The output of each of bistable devices 48 is therefore indicative of the total time a code element is stored in the corresponding one of storage elements 10. The instantaneous sum of the outputs of devices 48, therefore, is proportional to the total number of code elements instantaneously stored in storage elements 10. The signal across resistor 50 has this magnitude and is amplified in amplifier 51 to be applied to filter 31′.

As in FIG. 1, the signal applied to filter 31′ is proportional to the total amount of information stored in storage elements 10. Instead of accumulating phase discrepancies over an entire cycle of commutators 11 and 12, however, the circuit of FIG. 2 immediately reflects phase discrepancies arising between successive digits of the input pulse train. For any given phase distortion, therefore, the changes in this control voltage occur at a substantially higher rate than with the arrangement of FIG. 1. Since incremental changes occur more often with the arrangement of FIG. 2, filter 31′ does not have to remove variations in the control signal having the lower rate. In other words, the spurious frequency components to be discriminated against by the filter 31 in FIG. 1 are equal to and above the rate at which commutators 11 and 12 complete a full revolution. In FIG. 2 filter 31′ need discriminate against only those frequency components having a frequency equal to and above the cycling rate of commutators 11 and 12 multiplied by the number of segments on each commutator. Spurious variations in the control signal in FIG. 2 may therefore be at a much lower level than in FIG. 1.

Figure 3:
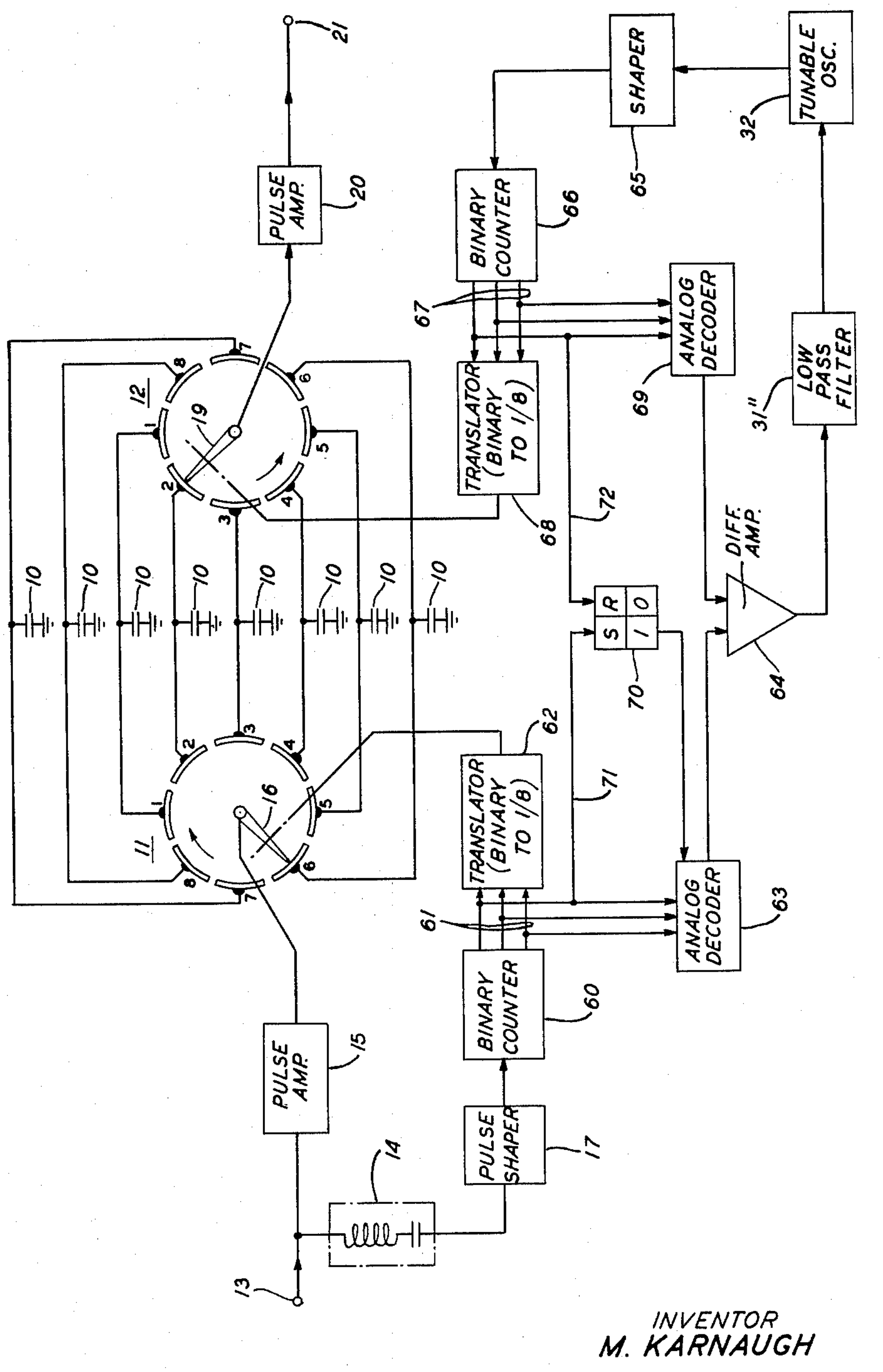
FIG. 3 is a schematic block diagram of another retiming pulse repeater in which the clock control is derived from a numerical comparator.

In FIG. 3 there is shown another embodiment of the present invention in which the content of the storage elements 10 is determined numerically rather than by a simple superposition of signals. In FIG. 3 the same reference numerals have again been used to identify components similar to those in the embodiments of FIGS. 1 and 2. Thus, an input pulse train arriving at input terminal 13 is simultaneously applied to a flywheel circuit 14 and a pulse amplifier 15. The output of amplifier 15 is applied to the brush 16 of a commutator 11 and the output of flywheel circuit 14 is applied to a pulse shaping circuit 17. Each of the segments of commutator 11 is connected to one of a bank of pulse storage elements 10 and to a corresponding one of the segments of commutator 12. A brush 19 successively contacts segments of commutator 12 and delivers code elements from storage elements 10 to a pulse amplifier 20. After being amplified in amplifier 20, these pulses are applied to output terminal 21 and thence to a utilization circuit such as a further transmission link.

In FIG. 3 the output of pulse shaper 17 is applied to a binary counter 60 which is of conventional design and produces on output leads 61 in binary notation the successive numbers one through eight. Counter 60 therefore produces eight distinguishable outputs, each one of which corresponds to one of the segments of commutator 11. A translating circuit 62 translates these binary numbers to control signals suitable for advancing brush 16 to the corresponding segments of commutator 11. Translator 62 may conveniently comprise a bank of diode AND gates for translating the three-digit input to a signal on one-out-of-eight output leads. These output signals can then be used to operate gates to connect the output of regenerator 15 to the proper one of storage elements 10.

The output of binary counter 60 is also connected to an analog decoder circuit 63 which translates the binary number at the counter output to a voltage having a corresponding magnitude. This voltage is applied to one input of a differential amplifier 64. Decoder 63 may conveniently comprise a passive network decoder of any of the types well-known in the art.

The output of the tunable oscillator 32 is applied to a shaping circuit 65 which forms sharp pulses from the sinusoidal output. These pulses are applied to a binary counting circuit 66 which may be identical to counter 60. Each pulse from shaping circuit 65 advances counter 66 one digit. The output of counter 66 appears as binary permutations of the signal conditions on output leads 67. The output on lead 67 is applied to translating circuit 68 which may be identical to translator 62 and serves to advance brush 19 of commutator 12 to the next segment for each new binary number. The output on lead 67 is also applied to an analog decoding circuit 69 which may be identical to decoder 63 and which generates a voltage proportional to the binary number applied to its input. The output of decoder 69 is applied to the second input of differential amplifier 64.

In the arrangement of FIG. 3 the binary output of counters 60 and 66 are indicative of the positions of brushes 16 and 19, respectively, since these outputs are used directly to control the brush positions. The output of differential amplifier 64 is therefore an analog representation of the difference in phase between brushes 16 and 19 and therefore of the amount of information stored in elements 10 at any particular instant. This output is applied to a low-pass filter 31'' which produces the control voltage for tuning oscillator 32.

A bistable device 70 is utilized to obtain an unambiguous difference between the counts in counters 60 and 66 when either of these counters is recycled. It will be noted that counters 60 and 66 will recycle once for each full revolution of brushes 16 and 19, respectively. Control lead 71 is arranged to set bistable device 70 to the On state when the most significant digit from counter 60 goes from "1" to "0." Similarly, control lead 72 is arranged to reset bistable device 70 to the Off state when the most significant digit of counter 66 goes from "1" to "0." The output of bistable device 70 is utilized in decoder 63 as an auxiliary digit to indicate when the count in counter 60 is higher than that in counter 66 although counter 60 has recycled through zero.

As in FIG. 2 the circuit of FIG. 3 improves the discrimination provided by filter 31'' since the information applied to differential amplifier 64 reflects the positions of the two brushes 16 and 19 on a segment basis rather than a cycle basis as in FIG. 1. The circuit of FIG. 3 has the further advantage of reducing the over-all amount of equipment required to detect the total information stored in storage elements 10. This can be seen if it is recalled that the stepping switch 18 in FIGS. 1 and 2 conveniently comprises a binary counter and a translator similar to counter 60 and translator 62 in FIG. 3 and, similarly, stepping switch 33 also conveniently comprises a counter and a translator similar to counter 66 and translator 68. The only additional equipment required would then be the decoders 63 and 69 and the differential amplifier 64. All of these additional elements are simple to construct, inexpensive, and comparatively reliable. Decoders 63 and 69, as noted above, may comprise passive network decoders while differential amplifier 64 is the only additional active element. In spite of this large reduction in equipment, the circuit of FIG. 3 has all of the advantages of the circuit of FIG. 2 and hence the discrimination provided by filter 31'' against spurious control signal variations is better than in FIG. 1.

It is to be understood that the above-described arrangements are merely illustrative of the numerous and varied other arrangements which may represent applications of the principles of the invention. These other arrangements may readily be devised by those skilled in the art without departing from the spirit and scope of this invention.

What is claimed is:

1. Pulse train retiming apparatus which comprises a pulse code store having capacity for storing a plurality of binary code elements, means for registering each code element of an irregular incoming pulse train in said store as it occurs, a timing wave source of controllable frequency, means for recovering said binary code elements from said store in regular succession under control of the wave of said source, means for utilizing said recovered code elements, and means responsive to the number of code elements momentarily registered in said store for controlling the frequency of said source to match the average frequency of occurrence of the pulses of said irregular train.

2. In a pulse repeater, a receiving circuit for incoming pulse trains to be repeated, flywheel timing means connected to said receiving circuit for deriving a continuous series of pulses having substantially the same times of occurrence as the pulse positions in said incoming pulse train, means controlled by said continuous series of pulses for writing successive pulse code elements of said incoming pulse train into different ones of a plurality of pulse storage elements, means for generating oscillations having a frequency equal to an integral multiple of the normal repetition rate of said input pulse train, said oscillation generating means being adapted to be adjusted in frequency by a control signal, means controlled by said oscillation generating means for reading pulse code elements from said pulse storage elements, means for generating a signal indicative of the average information content of said pulse storage elements, and means for applying said indicating signal to said oscillation generating means as said control signal.

3. The combination according to claim 2 in which said means for generating said indicating signal comprises bistable circuit means capable of remaining in either of two stable states, means for setting said bistable circuit to one of said stable states each time a fixed plurality of said pulse code elements is written into said pulse storage elements, means for resetting said bistable circuit to the other of said stable states each time the same fixed plurality of pulse code elements is read out of said pulse storage elements, and means for smoothing the output of said bistable circuit.

4. The combination according to claim 2 in which said means for generating said indicating signal comprises a plurality of bistable circuits equal in number to an integral sub-multiple of said plurality of pulse storage elements and corresponding to selected ones of said pulse storage elements, means for setting each of said bistable circuits each time a pulse code element is written into the corresponding one of said pulse storage elements, means for resetting each of said bistable circuits each time a pulse code element is read out of the corresponding one of said pulse storage elements, and means for deriving a signal proportional to the sum of the outputs of all of said bistable circuits.

5. The combination according to claim 2 in which said means for generating said indicating signal comprises first and second binary counting means, means controlled by said flywheel circuit for advancing said first binary counting means, means controlled by said oscillation generating means for advancing said second binary counting means, and means for deriving the difference between the counts of said first and second binary counting means.

6. A regenerative pulse repeater comprising coarse retiming means for generating a coarse timing signal from an irregular incoming pulse train, pulse train storage means, means for writing said irregular incoming pulse train into said pulse train storage means under the control of said coarse timing signal, fine retiming means for generating a fine retiming signal, means for reading said pulse train from said pulse train storage means under the control of said fine retiming signal, and means responsive to the length of each pulse train momentarily occupying said pulse train storage means for adjusting the frequency of said fine retiming means.

7. In combination, a source of permuted binary pulse trains, means for utilizing said pulse trains, and pulse retiming apparatus inserted between said source and said utilization means, said retiming apparatus comprising a plurality of pulse storage devices, means responsive to said pulse trains for registering the permutations of each said pulse train in said storage devices, variable frequency oscillator means, means responsive to said oscillator means for reading said pulse trains from said pulse storage devices, at least one bistable circuit means capable of producing two distinguishable output states, means responsive to said registering means for setting said bistable circuit means to produce one of said stable states, means responsive to said reading means for resetting said bistable circuit means to produce the other of said stable states, and means responsive to the output of said bistable circuit means for controlling the frequency of oscillation of said oscillator means.

8. The combination according to claim 7 wherein said registering means includes means for setting said bistable circuit means to produce said one stable state once for each time a pulse train is registered in said plurality of storage devices, and said reading means includes means for resetting said bistable circuit means to produce said other stable state once for each time a pulse train is read from said plurality of storage devices.

9. The combination according to claim 7 wherein said registering means includes means for setting bistable circuit means to produce said one stable state each time pulse information is registered in each one of said pulse storage devices, said reading means includes means for resetting bistable circuit means to produce said other stable state each time pulse information is read from each one of said pulse storage devices, and said frequency controlling means includes bistable circuit output averaging means.

10. The combination according to claim 7 wherein said registering means includes pulse code generating means responsive to said pulse trains for generating a coded representation of each position in said pulse train, said reading means also includes pulse code generating means for generating coded representations of said positions in said pulse train, and said frequency controlling means includes means for generating the difference between the outputs of said two pulse code generating means.

References Cited in the file of this patent

UNITED STATES PATENTS

| | | |
|---|---|---|
| 2,463,708 | McCreary | Mar. 8, 1949 |
| 2,891,109 | Steeneck | June 16, 1959 |
| 2,891,796 | De Lange | Apr. 25, 1961 |